Patented Aug. 7, 1945

2,381,771

UNITED STATES PATENT OFFICE 2,381,771

ANTIOXIDANTS

Philip T. Paul, Naugatuck, Conn., assignor to United States Rubber Company, New York, N. Y., a corporation of New Jersey No Drawing. Application October 19, 1943, Serial No. 506,880

8 Claims. (Cl. 260—800)

This invention relates to a new class of antioxidants or age-resisters for organic substances which tend to deteriorate by absorption of oxygen from the air, e. g., rubber or allied gums, unsaturated fatty oils, such as unsaturated vegetable oils, essential oils, petroleum oils and their derivatives such as gasolines, soaps, aldehydes, synthetic resin, turpentine, insecticides such as derris root, cube root and pyrethrum, and the like. The materials are exceptionally useful as flex-improvers or anti-flex cracking agents for vulcanized rubber, such as tire treads, which undergo repeated strains during use.

According to the invention, the organic substance is incorporated with a chemical of the formula

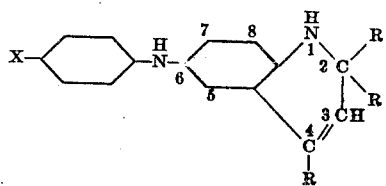

where X is any radical (substitute for hydrogen) which is inert to, that is, not chemically attacked by acidic reagents at temperatures below 170° C. Examples of such radicals are alkyl, aryl, chlorine, bromine, etc. R represents an alkyl radical.

The chemicals are designated para-substituted arylamino 2,2,4-trialkyl dihydroquinolines, and result from reacting a ketone, in the presence of an acidic catalyst, with a diarylamine of the formula

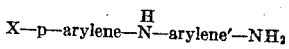

X represents the radical which is inert to the acidic catalyst. Either or both of the arylene groups may be further substituted except that arylene' should have at least one position ortho to the NH2 group, open.

The chemistry and activity of the ketone-amines are highly diversified, for example, while it is known that both primary and secondary diarylamines react with aliphatic ketones in the presence of acid catalysts, the reactions differ in that the amino group of the primary arylamine reacts with the ketone while a secondary diarylamine reacts with a ketone at the positions ortho or para to the nitrogen. The para position is especially reactive. This is shown by the wide divergence of reactivity of N-methyl diphenylamine and 4,4'-dimethyl diphenylamine towards acetone in the presence of an acid catalyst. N-methyl diphenylamine reacts readily with the acetone at temperatures as low as that of refluxing acetone, while 4,4'-dimethyl diphenylamine is inert at temperatures as high as 150° C. and is only slowly reactive at 250° C.

By the present invention I have found that an amino-substituted diarylamine, whose positions para to the secondary amino group are filled with substituents which are inert to the acidic catalyst of reaction, will form with a ketone, para-substituted arylamino 2,2,4-trialkyl 1,2-dihydroquinolines. Configurations permitting the reaction are:

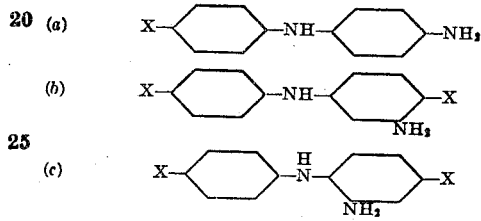

In the three configurations (a), (b), and (c) above at least one position ortho to the primary amino group (NH2) must be open, and where the NH2 group is not para to the —NH— group the inert radical (X) should be in a position para to the said —NH— group.

As examples of inert groups at "X," the following may be given: methyl, ethyl, propyl, isobutyl, n-amyl, hexyl, lauryl, phenyl, naphthyl, chlorine, bromine, etc.

Among examples of ketones that are reactive with any of the amines referred to herein are: acetone, methyl ethyl ketone, methyl propyl ketone. Acetone and methyl ethyl ketone are preferred examples.

Among examples of amines to be reacted with any of the above ketones are: 4-amino 4'-methyl diphenylamine, 3-amino 4,4'-dimethyl diphenylamine, 2-amino 4,4'-dimethyl diphenylamine, 4-amino 4'-ethyl diphenylamine, 4-amino 4'-propyl diphenylamine, 4-amino 4'-chloro diphenylamine.

Representative acidic catalysts are such as: iodine, hydriodic acid, ferrous chloride, ferrous bromide, ferrous iodide, hydrobromic acid, aluminum chloride.

Further exemplary of chemicals within the invention are:

6-(p-toluidino) 2,2,4-trimethyl 1,2-dihydroquinoline
6-(p-ethyl anilino) 2,2,4-trimethyl 1,2-dihydroquinoline
6-(p-chloro anilino) 2,2,4-trimethyl 1,2-dihydroquinoline
6-(p-bromo anilino) 2,2,4-trimethyl 1,2-dihydroquinoline
6-(p-xenyl) 2,2,4-trimethyl 1,2-dihydroquinoline
6-(p-propylanilino) 2,2,4-trimethyl 1,2-dihydroquinoline
6-(p-butyl anilino) 2,2,4-trimethyl 1,2-dihydroquinoline
5-(p-toluidino) 2,2,4,8-tetramethyl 1,2-dihydroquinoline
5-(p-ethylanilino) 2,2,4,8-tetramethyl 1,2-dihydroquinoline
8-(p-toluidino) 2,2,4,5-tetramethyl 1,2-dihydroquinoline
8-(p-toluidino) 2,2,4,6-tetramethyl 1,2-dihydroquinoline
6-(p-toluidino) 2-methyl 2,4-diethyl 1,2-dihydroquinoline
6-(b-naphthyl amino) 2,2,4-trimethyl 1,2-dihydroquinoline The following examples are given to illustrate the invention, the parts being by weight:

EXAMPLE 1

*Condensate of acetone and 4-amino 4'-methyl diphenylamine.*—A mixture of 240 gr. 4-amino 4'-methyl diphenylamine and 4.9 cc. hydriodic acid (density 1.7) was heated to 150° C. while 2000 cc. acetone was passed through. The product was dissolved in benzene, washed with dilute sodium hydroxide and the benzene evaporated. The residue was fractionated.

| Fraction | Boiling range | Amount |
|---|---|---|
| | | Gr. |
| I | 195-220° C./3 mm | 157 |
| II | 215-260° C./3 mm | 68.5 |
| III | Residue | 48.5 |

Fraction II was dissolved in benzene and washed with dilute hydrochloric acid to remove the last traces of 4-amino 4'-methyl diphenylamine. It was next washed with dilute sodium hydroxide and finally with water. The benzene solution was evaporated and the residue vacuum distilled. Boiling point 200° at 3 mm. (constant). Yield 21 grams.

*Analysis.*—Actual nitrogen 9.74%. Nitrogen calculated for 6 p-toluidino 2,2,4-trimethyl 1,2-dihydroquinoline is 10.07%.

EXAMPLE 2

*Acetone and 4,4'-dimethyl diphenylamine (reflux).*—A mixture of acetone (36 cc.), 4,4'-dimethyl diphenylamine (49 gr.) and 2.12 cc. hydriodic acid (density 1.7) was refluxed 48 hours. The product was poured into water, extracted with benzene and the benzene extract alkali washed and then vacuum distilled. Forty-five grams 4,4'-dimethyl diphenylamine were recovered.

EXAMPLE 3

*Acetone and 4,4'-dimethyl diphenylamine.*—A mixture of 73 gr. 4,4'-dimethyl diphenylamine and 4.65 gr. hydriodic acid solution (density 1.7) were heated at 150° C. until the elimination of water was complete. The temperature was raised to 150–160° C. and at that temperature acetone was passed through the mixture for 3 hours.

The reaction mixture was cooled, diluted with water and extracted with benzene. The benzene solution after washing with alkali was dried and the benzene evaporated. The residue was vacuum distilled.

| Fraction | Boiling range | Pressure | Amount |
|---|---|---|---|
| | | Mm. | Gr. |
| I | 162-165° C | 3 | 51 |
| II | 170-185° C | 3 | 5 |
| III | Residue | | 5.6 |

Fraction I consists of unchanged 4,4'-dimethyl diphenylamine; a loss of 10.4 gr. amine was encountered.

The following tests in rubber illustrate the effectiveness of the chemicals as antioxidants:

| Master batch | Parts |
|---|---|
| Smoked sheet | 100 |
| Carbon black | 45 |
| Zinc oxide | 5 |
| Pine tar | 3.5 |
| Zinc salt of cocoanut oil acids | 3.5 |
| Sulfur | 3.0 |
| Mercaptobenzothiazole | 1.0 |

To the above rubber compound (6-(p-toluidino)-2,2,4-trimethyl 1,2-dihydroquinoline was added in the ratio of 1.0 part to 100 parts rubber. Cures were made 45, 60, 75, and 90 minutes at 30 pounds steam. Flex-cracking resistance was determined according to the method of L. V. Cooper, Ind. Eng. Chem. Anal. Edition 2, 391 (1930).

UNAGED DUMBBELL FLEXINGS

*Expressed in kilocycles to end point*

| Cure lbs. at 30 minutes | Control | 6-(p-toluidino)-2,2,4-trimethyl 1,2-dihydroquinoline |
|---|---|---|
| 45 | 277 | 647 |
| 60 | 270 | 627 |
| 75 | 236 | 416 |
| 90 | 207 | 300 |
| | 990 | 1,990 |

The antioxidant stock was also superior in resisting heat and oxygen ageing.

By para-substituted arylamino group herein is meant that the aryl nucleus has its hydrogen atom in the para position to the amino group, replaced by any radical which is inert to the acidic reagents at temperatures below 170° C.

The invention may be applied to the preservation of, broadly, natural rubber compositions as well as artificially-prepared rubber compositions, such as polychloroprene, olefine polysulfides, butadiene polymers, modified butadiene polymers (Buna N and Buna S), and including reclaims, and latices of such compositions.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the antioxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surface of vulcanized or unvulcanized rubber goods.

Having thus described my invention, what I claim and desire to protect by Letters Patent is:

1. A method of retarding the deterioration of an organic substance which tends to deteriorate by absorption of oxygen from the air which comprises incorporating therein a para-substituted arylamino 2,2,4-trialkyl dihydroquinoline, the para-substituent being on the aryl nucleus and of a character inert to acidic reagents at a temperature below 170° C., said chemical being derived from reaction in the presence of an acidic catalyst of a ketone with an amino-substituted diarylamine having a position para to the secondary amino group, filled with said para-substituent.

2. A method of retarding the deterioration of an organic substance which tends to deteriorate by absorption of oxygen from the air which comprises incorporating therein a para-substituted arylamino 2,2,4-trialkyl dihydroquinoline, the para-substituent being on the aryl nucleus and of a character inert to acidic reagents at a temperature below 170° C., and the benzene nucleus of the quinoline group being unsubstituted in the position ortho to the nitrogen atom of the azine ring of the quinoline group, said chemical being derived from reaction in the presence of an acidic catalyst of a ketone with an amino-substituted diarylamine having a position para to the secondary amino group, filled with said para-substituent.

3. A method of retarding the deterioration of an organic substance which tends to deteriorate by absorption of oxygen from the air which comprises incorporating therein a para-substituted arylamino 2,2,4-trialkyl 1,2-dihydroquinoline, the para-substituent being on the aryl nucleus and of a character inert to acidic reagents at a temperature below 170° C., and the benzene nucleus of the quinoline group being unsubstituted in the position ortho to the nitrogen atom of the azine ring of the quinoline group, said chemical being derived from reaction in the presence of an acidic catalyst of a ketone with an amino-substituted diarylamine having a position para to the secondary amino group, filled with said para-substituent.

4. A method of retarding the deterioration of an organic substance which tends to deteriorate by absorption of oxygen from the air which comprises incorporating therein a para-substituted anilino 2,2,4-trialkyl 1,2-dihydroquinoline, derived from reaction in the presence of an acidic catalyst of a ketone with an amino-substituted diarylamine having its position para to the secondary amino group, filled with a para-substituent which is inert to the acidic catalyst at temperatures below 170° C.

5. A method of retarding the deterioration of an organic substance which tends to deteriorate by absorption of oxygen from the air which comprises incorporating therein a 6-(p-toluidino)-2,2,4-trialkyl 1,2-dihydroquinoline.

6. A method of preserving a rubber composition which comprises incorporating therein a para-substituted arylamino 2,2,4-trialkyl dihydroquinoline, the para-substituent being on the aryl nucleus and of a character inert to acidic reagents at a temperature below 170° C., said chemical being derived from reaction in the presence of an acidic catalyst of a ketone with an amino-substituted diarylamine having a position para to the secondary amino group, filled with said para-substituent.

7. An organic substance which tends to deteriorate by absorption of oxygen from the air containing a para-substituted arylamino 2,2,4-trialkyl dihydroquinoline, the para-substituent being on the aryl nucleus and of a character inert to acidic reagents at a temperature below 170° C., said chemical being derived from reaction in the presence of an acidic catalyst of a ketone with an amino-substituted diarylamine having a position para to the secondary amino group, filled with said para-substituent.

8. A rubber composition containing a para-substituted arylamino 2,2,4-trialkyl dihydroquinoline, the para-substituent being on the aryl nucleus and of a character inert to acidic reagents at a temperature below 170° C., said chemical being derived from reaction in the presence of an acidic catalyst of a ketone with an amino-substituted diarylamine having a position para to the secondary amino group, filled with said para-substituent.

PHILIP T. PAUL.